United States Patent
Itoh

[15] 3,704,350
[45] Nov. 28, 1972

[54] CORD HANGERS FOR HOIST

[72] Inventor: Akira Itoh, 7, 3-chome, Higashino-cho, Kohama, Sumiyoshi-ku, Osaka, Japan

[22] Filed: Sept. 23, 1970

[21] Appl. No.: 74,553

[52] U.S. Cl. .................... 191/12 R, 248/51, 105/151
[51] Int. Cl. ............................................. H02g 7/06
[58] Field of Search .............................. 248/50–58; 254/193–197; 104/89, 112; 191/12 R; 105/151

[56] References Cited

UNITED STATES PATENTS

| | | | |
|---|---|---|---|
| 1,291,079 | 1/1919 | Morris | 248/55 |
| 2,953,116 | 9/1960 | Lund | 105/151 |
| 1,007,432 | 10/1911 | Davis | 254/195 |
| 1,722,363 | 7/1929 | Young | 248/50 |
| 471,348 | 3/1892 | Collis | 248/55 |
| 1,488,651 | 4/1924 | Schumacher | 191/12 R |
| 1,733,270 | 10/1929 | Messer | 191/12 R |
| 2,571,832 | 10/1951 | Chapin | 191/12 R |
| 2,767,946 | 10/1956 | Weeks | 248/50 |

Primary Examiner—Gerald M. Forlenza
Assistant Examiner—D. W. Keen
Attorney—Wenderoth, Lind and Ponack

[57] ABSTRACT

A mobile carrier apparatus for detachably supporting from an elongated supporting cable or rod a flexible element of extensible character such as an insulated electric power cord or a fluid conduit connectable with a work member serviced by said flexible element. The carrier is made up of a composite element-hanger having detachably connected upper and lower brackets, each having a freely rotatable roller or pulley wheel disposed above and below the supporting cable. From the lower bracket there depends in swivel like fashion a further composite cord-gripping support made from a pair of separable complementally shaped segments which can be adjustably closed relative to one another to grip cords of varying cross-sectional size therebetween. The mobile carriers of this type are usually used in plural form to pay out the supported flexible cord or element as needed in use, said cord usually being formed in coiled loops when returned after use with a mobile carrier of this type supporting each of the loops.

12 Claims, 8 Drawing Figures

PATENTED NOV 28 1972 3,704,350

AKIRA ITOH
INVENTOR

BY Wenderoth, Lind & Ponack
ATTORNEY

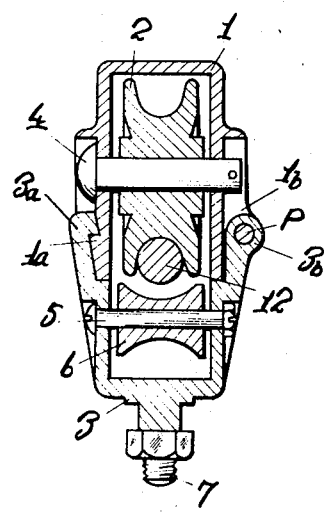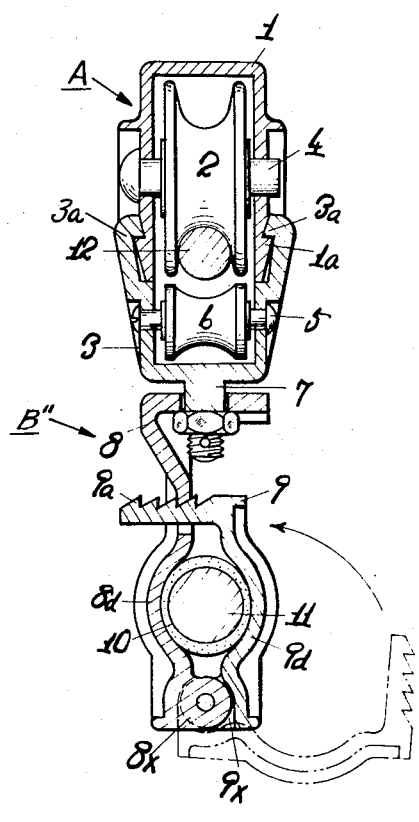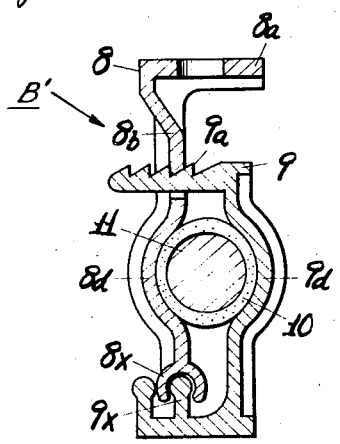

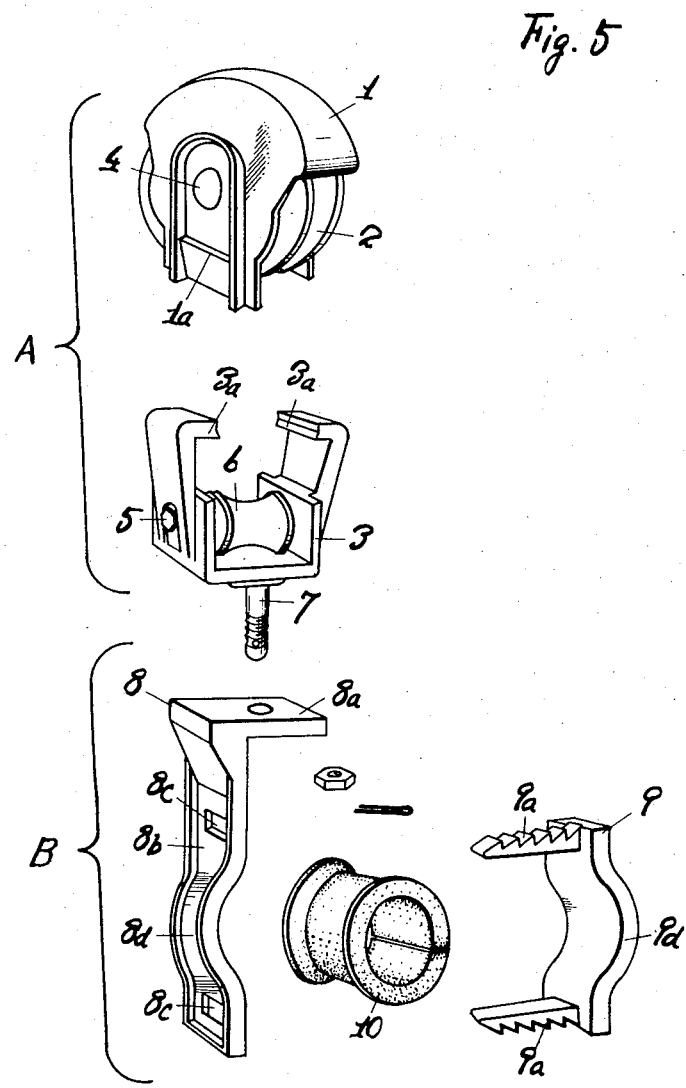

CORD HANGERS FOR HOIST

This invention relates to a combination mobile carrier and hanger for various uses such as when supplying electric current, through an insulated supply cord, to a movable electric apparatus which may be mounted on a hoist, or a small type crane, or the like, characterized in that the supply cord and a stretched messenger or support line can respectively and easily be passed through and removed from different parts of the hanger and in such a manner that the supply cord can be suspended flexibly.

This general prior art kind of cord hanger usually has a bracket in which a carrier roller and a guide roller are fixed by means of separate axles, but in such a non-separable manner that in passing through a messenger line between the said carrier roller and the guide roller, the messenger line must be threaded through from its one end. In other words, these prior known cord hangers cannot be used in association with a support or messenger line which has already been strung up. Moreover, a cord supporting member to hold a flexible supply conduit or cord usually comprises two opposite metal fittings in Ω (omega) shape, which heretofore have generally required coupling together by means of a bolt and a nut. Accordingly, it is particularly difficult to assemble such metal fittings by bolt and nut at high places, such as on overhead cable or rod supports.

This invention has for its object to eliminate the above-mentioned disadvantages of the cord hanger of known types.

Descriptions will be made below of a flexible cord hanger according to the present invention, with reference to the attached drawings, in which:

FIGS. 3A and 3B show respectively cross-sectional views of different embodiments of the composite bracket part.

FIGS. 4A and 4B show respectively cross-sectional views of different embodiments of the cord supporting member of the hanger, also of composite form.

FIG. 5 shows a perspective view of the various disassembled parts of the hanger brackets and the cord supporting segments or members, and FIG. 6 is a cross-sectional view of the bracket part shown in FIG. 3A but with which is engaged a cord supporting member of still a different type than that shown in FIGS. 4A and 4B.

Figure 4A:
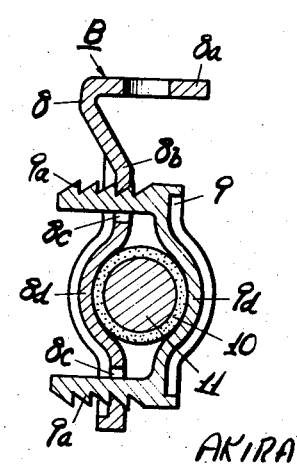

In the drawings, numeral 1 denotes an upper bracket of the mobile carrier, which bracket 1 is formed in inverted-U shape. Rotatably supported in this upper bracket 1 by means of an axle 4, is a carrier roller 2. Claws or shoulder portions 1a, 1a are formed near the bottom outer surface of the upper bracket 1. Numeral 3 denotes a lower bracket of U-shape, with its opening facing upwardly. Claws 3a, 3a are formed at the upper inner surface of this lower bracket 3. It is so designed that said claws 3a, 3a and claws 1a, 1a of the upper bracket complementally engage with each other and thus the upper bracket 1 and the lower bracket 3 are detachably connected. Loosely and rotatably supported in the lower bracket 3 by means of a pin axle 5 is a guide roller 6. When the upper bracket 1 and the lower bracket 3 are interconnected by engagement of complemental claws 1a and claws 3a it can be readily assembled around, a messenger line 12 (or a stretched rope) which is held between peripheral grooves of the respective carrier roller 2 and the guide roller 6. In other words, the messenger line is embraced by a recessed groove formed between rollers 2 and 6 so that composite bracket means A comprising the upper bracket 1 and the lower bracket 3 so as not to detach from the messenger line. At the underside of the lower bracket 3, a composite cord supporting means B is suspended by means of a pin 7 made separately or through the medium of a connecting pin 7 which is made integral with the lower bracket 3, or with the cord supporting means B. As indicated by FIGS. 4A and 4B, the composite cord supporting means B comprises a main body 8 of substantially inverted-L shape, having a horizontal upper piece or short leg and a longer perpendicular leg or piece, and a cord gripper segment 9. The afore-mentioned connecting pin 7 is put through a hole formed in the upper piece 8a of the main body 8, whereby the cord supporting means B is connected in a swivel-like movable manner with the bracket means A. The perpendicular piece 8b is curved in a lower or medial part so that a curved part 8d may fit the arcuate or contoured surface of a flexible cord. Adjacent the upper and the lower parts of the curved portion 8d, there are provided engagement holes 8c, 8c. The cord gripper 9 is detachably engaged with the main body 8 of the cord supporting member to hold a flexible element or cord 11 between the main body 8 and the cord gripper 9. The cord gripper 9 is preferably also formed complemental to portion 8d in substantially C-shape and its curved portion 9d at the center corresponds to the curved portion 8d of the main body 8. Thus, the flexible cord is supported between the curved portions 8d and 9d. The cord presser 9 further includes a pair of spaced leg portions respectively having saw-toothed arms or engagement claws 9a, 9a, which are inserted in corresponding body engagement holes 8c, 8c whose respective adjacently disposed upper and lower wall portions are complementally slanted, or beveled, to thereby connect the main body 8 with the cord gripper 9 in a unitary assembly or body. In this case, a plurality of engagement teeth or claws 9a are provided, as shown by FIG. 5, to make the embracing force constant by adjusting the extent of which the serrated arms or engagement claws are to be inserted in the engagement hole according to various diameters of the flexible cords. The distance between transversely projecting serrated arms 9a and 9a is made slightly larger than that between engagement holes 8c and 8c so that when said arms are inserted in engagement holes, firm engagement is effected due to an inherent elasticity of said arms in the outward direction, thereby engaging the main body 8 with the cord gripper 9 as a unit.

The bracket means A comprising the upper bracket 1 and the lower bracket 3, the cord supporting means B and other parts should preferably be made of either metal or synthetic resin having suitable elasticity so as to ensure firm engagement of the respective parts.

In cases where a flexible cord 11 is to be suspended by the bracket of the above-mentioned construction, engagement claws of the upper bracket 1 and the lower bracket 3 are disengaged and reapplied to each other around the messenger line 12, with the line 12 held between the carrier roller 2 and the guide roller 6. Then, while both brackets are being engaged with each other as a unit by means of the respective claws, a rubber cushioning piece 10 in generally cylindrical or drum shape for protection of the flexible cord 11 is applied thereon by means of a longitudinal slit, and is then assembled with the main body of the cord supporting member, 8, being engaged by the cord gripper 9 so as to support the cord 11. In cases where two or more flexible cords are used, another or further cord supporting means B, made either integrally or separately, may be connected to and below the first cord supporting means B.

Figure 1:
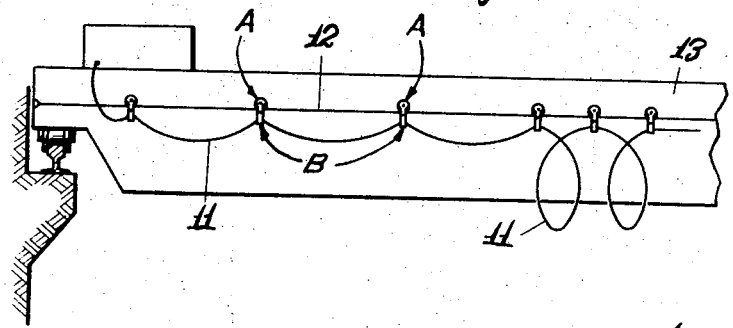
FIG. 1 is a diagram illustrating the condition under which hangers according to the present invention are used in conjunction with an overhead hoist.
Figure 2:
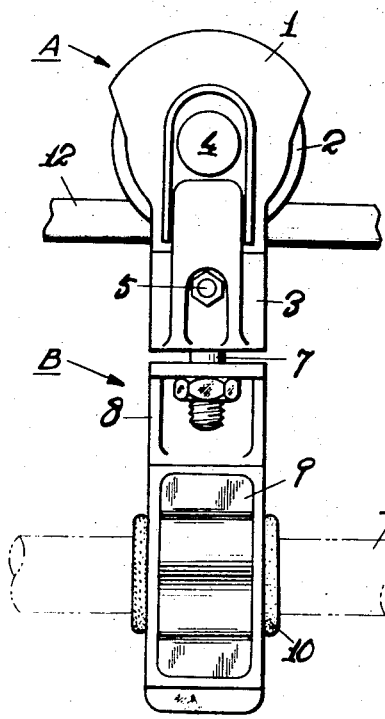
FIG. 2 is a front view, showing the condition under which the flexible supply cord hanger of the present invention is used.

FIG. 1 shows the state in which the cord hanger according to the present invention is used. The messenger line 12 and the flexible cord 11 connected to the hoist are stretched along a girder 13, whereby the bracket A is free to travel as it is suspended by the messenger line and in turn supports the flexible cord 11.

Figure 3A:
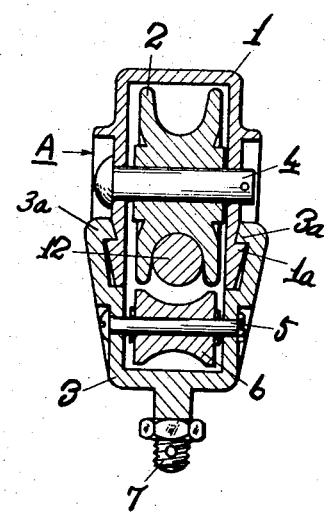

The afore-mentioned is an explanation of the combination of the hanger A shown by FIG. 3A and the cord supporting means B shown by FIG. 4A. Different embodiments of the bracket part and the cord supporting member are shown in FIG. 3B, FIG. 4B and FIG. 6. Referring to the bracket part shown by FIG. 3B, the engagement of the upper bracket 1 with the lower bracket 3 is effected in the following way:

Engagement pieces or link-like portions 1b and 3b are provided with hinged barrel portions which are pivotally secured by a pin P so that they act as if they were a hinge. The formerly described type of engagement claws 1a and 3a are provided opposite the hinge so that the upper bracket and the lower bracket may be opened and closed without need for completely separating them, but the other parts thereof are the same as in the case of FIG. 3A. A further embodiment of cord supporting means B' is shown by FIG. 4B and comprises an engagement piece 8x at the lower end of the main body 8 and another engagement piece 9x at the lower end of the cord gripper body. These engagement pieces 8x and 9x complementally engage with each other. The engagement of the main body 8 with the cord gripper 9 is of the open-close type as mentioned above, i.e., it has one saw-toothed leg for selective insertion into the complemental engagement hole of the main body 8. Still another cord supporting means B'' is shown in FIG. 6 is an embodiment in which the main body 8 and the cord gripper 9 are inter-engaged in the fashion of hinge. The bracket parts or means shown in FIGS. 3A and 3B could be used in combination with any of cord supporting members or means shown in FIGS. 4A and 4B.

The foregoing is a description of how to suspend the flexible cord 11. In FIG. 1, if numeral 12 depicted a stretched support cable or rope and numeral 11 depicted an air pipe to supply compressed air, they could be used in conjunction with an air operating apparatus.

According to the present invention, the upper bracket and the lower bracket can attach to a messenger line or a stretched rope by simplified means of only engaging the opposing engagement claws. This dispenses with the trouble of bolting, etc. and makes it quite easy to assemble at a high place. Moreover, because the bracket means A is connected with the rotatable swivelly attached flexible cord-supporting means B, it can move freely in proportion or relative to the movement of the flexible cord. Further, because holding of the flexible cord is effected by an inter-engagement of saw tooth claws of the cord gripper 9 with holes of the main body 8, such holding can be done with ease and attachment of flexible element or cord is made easy.

What is claimed is:

1. A mobile carrier means for detachably supporting from an elongated generally horizontal support a flexible element of extensible character such as an insulated electric power cord, or a fluid conduit, connectable with a work member serviced by said flexible element, said carrier comprising in combination
    a. at least one support-mountable element hanger of composite upper and lower bracket form;
    b. said upper bracket having a freely rotatable carrier roller or pully wheel for cooperative mounting upon and mobile movement along said elongated support;
    c. said lower bracket having means for detachably mounting it in depending fashion from and cooperatively with complemental means provided on said upper bracket;
    d. said lower bracket having a guide roller or pulley wheel disposed for cooperation with and below said elongated support when attached to said upper bracket with said elongated support disposed between the respective rollers or pulleys of said upper and lower brackets;
    e. a composite flexible-element-support-and-gripping means, having cooperative means on an upper portion thereof and also on a depending lower portion of said lower portion of said lower bracket by which said flexible-element-support is detachably hung therefrom in a manner providing for free pivotal movement about a generally vertical pivot axis; and
    f. said flexible-element-support including two separable complementally shaped segments for effecting the gripping of a flexible element therebetween.

2. A mobile carrier as defined in claim 1, wherein said complementally shaped segments of paragraph (f) include interengaging co-acting means adjustable for gripping flexible elements of varying cross-sectional size.

3. A mobile carrier as defined in claim 1, further including in association with said two complemental shaped segments of paragraph (f) flexible sleeve-like means for protectively surrounding said flexible element at least in the gripping area thereof.

4. A mobile carrier as defined in claim 1, wherein said upper bracket of paragraphs (a) and (b) is of generally inverted U-shape having said rotatable carrier roller disposed between opposed legs which terminate in free downwardly directed ends; said lower bracket or paragraph (c) is of generally upright U-shape having said guide roller thereof mounted between opposed legs terminating in upwardly extending free ends; said brackets being fabricated of a material which enables at least one of said free leg ends of one bracket to yield slightly relative to a corresponding one of the other bracket to facilitate their mounting one on the other; and wherein the means detachably interconnecting said upper and lower brackets of paragraphs (b) and (c) include complementally interengaging end portions of said respective free leg end portions of said upper and lower brackets.

5. A mobile carrier as defined in claim 4, wherein at least one pair of corresponding interengaging free leg ends of said upper end lower brackets are provided with inversely disposed coacting claw means capable of frictional snap-on interlocking engagement with one another.

6. A mobile carrier as defined in claim 5 wherein the other pair of corresponding interengaging free leg ends, of said respective upper and lower brackets, are provided with complemental coacting hinge-forming means to provide for separable detachment of the lower and upper brackets to facilitate assemble with and disassembly from a pro-existing, generally horizontal support.

7. A mobile carrier as defined in claim 4 wherein both corresponding pairs of interengaging free leg ends of said upper and lower brackets are provided with inversely disposed coacting claw means having complemental frictional snap-on interlocking engagement with one another.

8. A mobile carrier as defined in claim 1, wherein said composite flexible element-support-and-gripping means includes a main body of inverted L-shape with a short leg of the L generally horizontally disposed and having a hole therein to receive a connecting pin therethrough, said connecting pin dependingly connected to a lower portion of said lower U-shape bracket and constituting part of the means for effecting said hanging for pivotal mounting about the generally vertical axis; said L-shape body having a longer leg disposed generally perpendicular to said shorter leg, and having a medial portion pre-shaped to conform to at least part of the outer surface of said flexible element and constituting one of said two complementally shaped segments of paragraph (f) to hold said flexible element; said longer leg having an upper and lower engagement hole provided in the perpendicular part at opposite sides of said medial pre-shaped portion, said engagement holes provided with oppositely beveled edges relative to the generally vertically disposed main body at their respectively remotely opposite sides; the other of said two shaped segments being an auxiliary body and near generally opposite end thereof being provided with hole-engaging arms projecting transversely therefrom in a common direction, said arms each having a remotely opposed saw tooth edge for complemental and adjustable engagement with said respectively beveled edges of said engagement holes in said main body.

9. A mobile carrier as defined in claim 1 wherein the two shaped segments of paragraph (f) each have correspondingly disposed means to form a pivotal, hinge-like interconnection with one another, and having complementally formed, serrated or saw-tooth arm and beveled aperture means for releasably interlocking said segments together around a flexible element and at a point beyond where said flexible element would be gripped between said segments.

10. A mobile carrier as defined in claim 1, wherein said cooperative means of paragraph (e) for interconnecting said flexible-element-support-and-gripping means with said lower bracket include attaching stud and aperture and means for retaining said stud for said freely pivotal movement about a generally vertical pivot axis constituted by said attaching stud.

11. A mobile carrier means for detachably supporting from an elongated, generally horizontal support a flexible element such as an extensible insulated electric power cord, or a fluid conduit, connectable with a work member serviced by said flexible element and with said flexible element being attachable beneath said carrier, said carrier comprising in combination
 a. at least one carriage of composite, separably interconnected upper and lower bracket form with means for interconnecting said brackets and with means by which the flexible element is attachably supportable by said lower bracket;
 b. said upper bracket being of generally inverted U-shape having a rotatable carrier roller disposed between opposed legs which terminate in free downwardly directed ends; said carrier roller disposed for cooperative mounting upon and mobile movement along said elongated support;
 c. said lower bracket being of upright U-shape having a guide roller thereof mounted between opposed legs which terminate in upwardly extending free ends, said guide roller disposed for cooperation with and below said elongated horizontal support when attached to said upper bracket and with said elongated horizontal support disposed between the respective rollers of said respective brackets;
 d. said means for interconnecting said upper and lower brackets include complemental releasably interlocking portions of said free leg end portions of said upper and lower brackets, and said brackets constructed so that at least one of said free leg ends of one bracket is slightly resiliently yieldable relative to a corresponding one on the other bracket to facilitate their interlocking engagement relationship.

12. A composite support-and-gripping means for assembly around and for detachably supporting a flexible element such as an insulated electric power cord, or a fluid conduit, in detachable and depending association with an overhead carrier usually of the type movably mounted upon and for movement along a generally horizontally stretched cable or elongated rod-like support, the overhead carrier having means for mounting said composite support-and-gripping means in a depending manner therefrom, said composite support-and-gripping means comprising in combination
 a. two independently separable coacting bracket segments, each having complementally pre-shaped portions in their generally medial area to conform to at least part of the outer surface of and for gripping the flexible element therebetween when assembled around said flexible element;
 b. one of said segments being a main body of inverted generally L-shape formation, with the short leg of the L being generally horizontally disposed with means for attaching to said overhead carrier so as to have free movement about a generally vertical axis;
 c. said L-shaped main body having its longer leg disposed generally perpendicular to said shorter leg, and having spaced apart upper and lower engagement holes oppositely adjacent its medial preshaped portion.

d. the other of said two segments being an auxiliary body provided oppositely adjacent its medial preshaped portion near opposite ends thereof with transversely projecting means for interengaging with said upper and lower engagement holes of said L-shaped main body to facilitate the coacting assembly thereof around the flexible element to be supported, and e. at least one of said transversely projecting means of the auxiliary body being of semi-resilient, elongated arm-like formation having a plurality of sawtooth like notches in one for for detachable interlocking engagement with the corresponding engagement hole.

* * * * *

PO-1050
(5/69)

UNITED STATES PATENT OFFICE
CERTIFICATE OF CORRECTION

Patent No. 3,704,350                    Dated November 28, 1972

Inventor(s)    AKIRA ITOH

It is certified that error appears in the above-identified patent
and that said Letters Patent are hereby corrected as shown below:

in the printed heading of the above patent
kindly insert in the appropriate space --Foreign Application Priority Data

| Oct. 4, 1969 | Japan | 79537/69 |
| Jan. 22, 1970 | Japan | 7053/70 |
| Jan. 22, 1970 | Japan | 7054/70 |
| Jan. 22, 1970 | Japan | 7055/70 -- |

Signed and sealed this 22nd day of May 1973.

(SEAL)
Attest:

EDWARD M. FLETCHER, JR.                    ROBERT GOTTSCHALK
Attesting Officer                          Commissioner of Patents